(12) United States Patent
Brewer et al.

(10) Patent No.: US 11,416,331 B2
(45) Date of Patent: Aug. 16, 2022

(54) MODIFIED CHECKSUM USING A POISON DATA PATTERN

(71) Applicant: Micron Technology, Inc., Boise, ID (US)

(72) Inventors: Tony M. Brewer, Plano, TX (US); Bryan D. Hornung, Plano, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/116,143

(22) Filed: Dec. 9, 2020

(65) Prior Publication Data

US 2022/0179735 A1 Jun. 9, 2022

(51) Int. Cl.
*G06F 11/10* (2006.01)
*G06F 13/40* (2006.01)
*G06F 11/07* (2006.01)

(52) U.S. Cl.
CPC ...... *G06F 11/1004* (2013.01); *G06F 11/0772* (2013.01); *G06F 11/1068* (2013.01); *G06F 13/4022* (2013.01)

(58) Field of Classification Search
CPC ............. G06F 11/1004; G06F 11/0772; G06F 11/1068; G06F 13/4022
USPC ........ 714/764, 795, 766, 768, 773, 799, 800
See application file for complete search history.

(56) References Cited

U.S. PATENT DOCUMENTS

| | | | |
|---|---|---|---|
| 7,925,931 B1 * | 4/2011 | Smith ................. | G06F 11/0793 714/43 |
| 8,438,452 B2 | 5/2013 | Agarwal et al. | |
| 8,910,280 B2 | 12/2014 | Karasaridis | |
| 9,213,609 B2 | 12/2015 | Hansen et al. | |
| 10,445,236 B2 | 10/2019 | Boyle | |
| 11,216,335 B2 * | 1/2022 | Shin ...................... | G06F 11/102 |
| 2003/0126409 A1 | 7/2003 | Juan et al. | |
| 2006/0077750 A1 * | 4/2006 | Pescatore ............. | G06F 11/1004 365/232 |
| 2007/0226588 A1 * | 9/2007 | Lee ...................... | G06F 11/1068 714/E11.038 |
| 2013/0262421 A1 | 10/2013 | Ferguson et al. | |
| 2014/0006879 A1 * | 1/2014 | Rangarajan ........... | G06F 11/004 714/48 |
| 2019/0138379 A1 | 5/2019 | Rangarajan | |

(Continued)

OTHER PUBLICATIONS

International Search Report and Written Opinion from related International Patent Application No. PCT/US2021/061593, dated Apr. 4, 2022, 11 pages.

*Primary Examiner* — John J Tabone, Jr.
(74) *Attorney, Agent, or Firm* — Brooks, Cameron & Huebsch, PLLC

(57) ABSTRACT

Systems, apparatuses, and methods related to modified checksum data using a poison data indictor. An example method can include receiving a first set of bits including data and a second set of at least one bit indicating whether the first set of bits includes one or more erroneous or corrupted bits. A first checksum can be generated that is associated with the first set of bits. A second checksum can be generated using the first checksum and the second set of at least one bit. The first set of bits and the second checksum can be written to an array of a memory device. A comparison of the first checksum and the second checksum can indicate whether the first set of bits includes the at least one or more erroneous or corrupted bits.

20 Claims, 5 Drawing Sheets

(56) References Cited

U.S. PATENT DOCUMENTS

| | | | |
|---|---|---|---|
| 2019/0155685 A1* | 5/2019 | Kim | G06F 11/1048 |
| 2019/0190540 A1* | 6/2019 | Tsuboi | H03M 13/616 |
| 2019/0377511 A1 | 12/2019 | Pawlowski | |
| 2020/0125503 A1 | 4/2020 | Graniello et al. | |
| 2020/0241958 A1* | 7/2020 | Shin | H03M 13/09 |
| 2021/0083687 A1* | 3/2021 | Lee | H03M 13/116 |
| 2021/0286739 A1* | 9/2021 | Vankayala | H01L 25/0657 |

* cited by examiner

MODIFIED CHECKSUM USING A POISON DATA PATTERN

TECHNICAL FIELD

The present disclosure relates generally to semiconductor memory and methods, and more particularly, to apparatuses, systems, and methods for modified checksum using a poison data pattern.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, ferroelectric random access memory (FeRAM), and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

DETAILED DESCRIPTION

Figure 1:
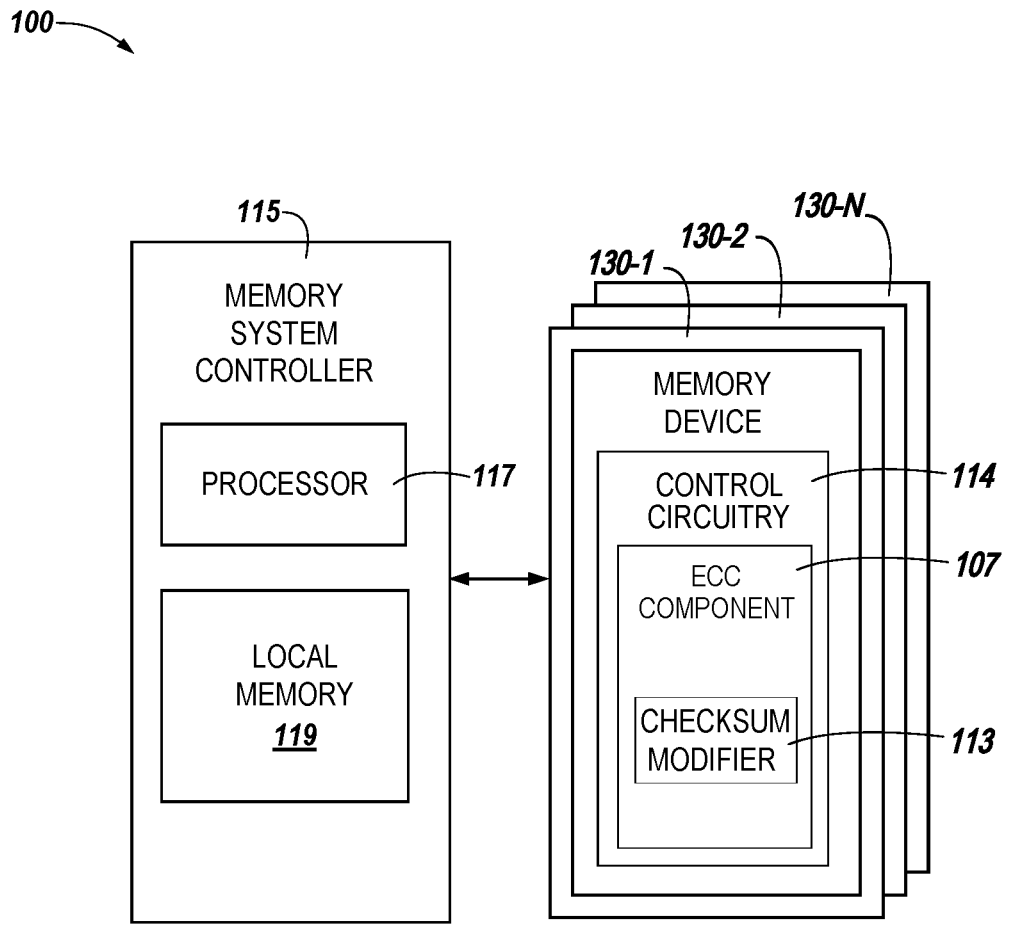
FIG. 1 is a block diagram in the form of a computing system including a controller and memory devices in accordance with a number of embodiments of the present disclosure.

Systems, apparatuses, and methods related to a modified checksum using a poison data pattern are described. In some embodiments, a controller at logic of a memory device can receive a first set of bits including data and a second set of at least one bit indicating whether the first set of bits includes one or more erroneous or corrupted bits. The controller can cause generation of checksum data associated with the first set of bits. The controller can cause generation of modified checksum data using the checksum data and the second set of at least one bit. The controller can cause writing of the first set of bits and the modified checksum data in an array of the memory device.

Data can be received (e.g., to a memory system) as incorrect or corrupted data. Such incorrect or corrupted data may be referred to as "poison data." A poison data indicator (e.g., a bit, referred to herein as a second set of at least one bit or a poison data pattern that includes a number of bits) can be used to indicate whether the received data is poison data. The poison data indicator can be written, for example, with the incorrect or corrupted data. In addition, a source of the corruption of the data can be a local media read that has accessed the data. Further, as an example, a poison bit value of "1" may indicate the data is incorrect or corrupted and such a poison bit value can be written to the memory with the data, and a poison bit value of "0" may indicate that the data is not poison data. This poison bit value can indicate to modify a checksum (e.g., checksum value) by performing an XOR operation with a poison data pattern and then storing the modified checksum with the associated data. Further, however, embodiments are not so limited. For instance, a poison bit value of "0" could be used to indicate poison data and a bit value of "1" could be used to indicate the data is not poison data.

In some prior approaches, an array of memory cells may store poison data indictors (e.g., a bit value) associated with the different portions of data that may or may not be poison data (depending the value of the poison data indictor). For example, in these prior approaches, X data bits may be received and Z checksum bits are generated from the X data bits. In the scenario where a checksum that protects the data is stored without a determination of whether the data is poison, X+Z=Y bits may be stored. In the scenario where poison data is monitored, Y+1 bits can be stored where the "+1" bit is a poison bit that indicates whether the data is poison data (e.g., a "1" indicates the data is poison, a "0" indicates the data is not poison).

However, as will be described further below, the poison data indicator may not be stored directly into the memory array or memory devices as a separate value. For example, the poison data indicator may be combined or incorporated into checksum data associated with the transferred data and thereby save memory space that would have otherwise stored the individual poison data indicator. This would include storing Y bits (X data bits+Z checksum bits) while the checksum both protects the data and also indicates whether the data is poison data. The poison data can be determined by reading these Y bits. In this way, an amount of space for storing a particular portion of data in a memory array may be minimized. Put another way, the data and its associated checksum data can be stored in a particular amount of memory space. The particular amount of memory space can also store the poison data indicator by combining or incorporating the poison data indicator into the checksum data and storing the checksum data in a same amount of memory space as when the checksum data does not combine or incorporate the poison data indicator.

As described in more detail herein, a controller coupled to a memory device can receive a portion of data (e.g., a first set of bits including data) along with an associated poison data indicator (e.g., a second set of at least one bit indicating whether the first set of bits includes one or more erroneous or corrupted bits) from an external device (e.g., a host or some other external memory device). The data can be encoded and checksum data can be generated for protection of the data. The received poison data indicator can be incorporated into the checksum data in order to maintain whether the data is poison or not without storing the individual poison data indicator itself. The data and the modified checksum data can be stored in a memory device. In response to the external device requesting the data to be returned to the external device, the modified checksum data can be analyzed, as will be described below, and the data and the poison data indictor can be returned to the external device. In this way, the data and its associated poison data indictor can be maintained without storing the individual poison data indictor in the memory device, thereby preserving more memory space.

In some embodiments, a memory system including the memory device can be a Compute Express Link (CXL) compliant memory system (e.g., the memory system can include a PCIe/CXL interface). CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost.

CXL is designed to be an industry open standard interface for high-speed communications, as accelerators are increasingly used to complement CPUs in support of emerging applications such as artificial intelligence and machine learning. CXL technology is built on the peripheral component interconnect express (PCIe) infrastructure, leveraging PCIe physical and electrical interfaces to provide advanced protocol in areas such as input/output (I/O) protocol, memory protocol (e.g., initially allowing a host to share memory with an accelerator), and coherency interface.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

As used herein, designators such as "N," "M," etc., particularly with respect to reference numerals in the drawings, indicate that a number of the particular feature so designated can be included. It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of memory banks) can refer to one or more memory banks, whereas a "plurality of" is intended to refer to more than one of such things.

Furthermore, the words "can" and "may" are used throughout this application in a permissive sense (e.g., having the potential to, being able to), not in a mandatory sense (e.g., must). The term "include," and derivations thereof, means "including, but not limited to." The terms "coupled" and "coupling" mean to be directly or indirectly connected physically or for access to and movement (transmission) of commands and/or data, as appropriate to the context.

The figures herein follow a numbering convention in which the first digit or digits correspond to the figure number and the remaining digits identify an element or component in the figure. Similar elements or components between different figures may be identified by the use of similar digits. For example, 115 may reference element "15" in FIG. 1, and a similar element may be referenced as 215 in FIG. 2. A group or plurality of similar elements or components may generally be referred to herein with a single element number. For example, a plurality of reference elements 130-1 to 130-N may be referred to generally as 130. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 is a block diagram in the form of a computing system 100 including a controller 115 and memory devices 130-1 to 130-N in accordance with a number of embodiments of the present disclosure. In the embodiment illustrated in FIG. 1, the memory devices 130 can include one or more memory modules (e.g., single in-line memory modules, dual in-line memory modules, etc.). The memory devices 130 can include volatile memory and/or non-volatile memory. In a number of embodiments, the memory devices 130 can each include a multi-chip device. A multi-chip device can include a number of different memory types and/or memory modules. For example, a memory system can include non-volatile or volatile memory on any type of a module.

The memory device(s) 130 can provide main memory for the computing system 100 or could be used as additional memory or storage throughout the computing system 100. The memory device 130 can include one or more arrays of memory cells, (e.g., volatile and/or non-volatile memory cells). The arrays can be flash arrays with a NAND architecture, for example. Embodiments are not limited to a particular type of memory device. For instance, the memory device can include RAM, ROM, DRAM, SDRAM, PCRAM, RRAM, and flash memory, among others. Although shown as a single memory device 130, it will be appreciated that multiple memory devices are contemplated within the scope of the disclosure.

In embodiments in which the memory device 130 includes persistent or non-volatile memory, the memory device 130 can be flash memory devices such as NAND or NOR flash memory devices. Embodiments are not so limited, however, and the memory device 130 can include other non-volatile memory devices such as non-volatile random-access memory devices (e.g., NVRAM, ReRAM, FeRAM, MRAM, PCM), "emerging" memory devices such as a ferroelectric RAM device that includes ferroelectric capacitors that can exhibit hysteresis characteristics, a 3-D Crosspoint (3D XP) memory device, etc., or combinations thereof.

As an example, a ferroelectric RAM device can include ferroelectric capacitors and can perform bit storage based on an amount of voltage or charge applied thereto. In such examples, relatively small and relatively large voltages allow the ferroelectric RAM device to exhibit characteristics similar to normal dielectric materials (e.g., dielectric materials that have a relatively high dielectric constant) but at various voltages between such relatively small and large voltages the ferroelectric RAM device can exhibit a polarization reversal that yields non-linear dielectric behavior.

As another example, a 3D XP array of non-volatile memory can perform bit storage based on a change of bulk resistance, in conjunction with a stackable cross-gridded data access array. Additionally, in contrast to many flash-based memories, 3D XP non-volatile memory can perform a write in-place operation in which a non-volatile memory cell can be programmed without the non-volatile memory cell being previously erased.

In some embodiments, the controller 115 can be a media controller such as a non-volatile memory express (NVMe) controller. For example, the controller 115 can be configured to perform operations such as copy, write, read, error correct, etc. for the memory device 130. In addition, the controller 115 can include special purpose circuitry and/or instructions to perform various operations described herein. That is, in some embodiments, the controller 115 can include circuitry and/or instructions that can be executed to modify checksum data using a poison data indictor (also referred to herein as a second set of at least one bit, where the second set of at least one bit indicates whether a first set of bits comprises one or more erroneous or corrupted bits). In some embodiments, circuitry and/or instructions provided to the controller 115 can control modifying checksum data using a poison data indictor and storing or writing the data (also referred to herein as a first set of bits including data) and the modified checksum data in the memory device 130.

In some embodiments, control circuitry 114 within each of the memory devices 130 can be configured to perform operations such as copy, write, read, error correct etc. The control circuitry 114 can include an ECC component 107. The ECC component 107 can be operated based on various types of ECC codes, such as Hamming codes, Reed-Solomon (RS) codes, Bose-Chaudhuri-Hochquenghem (BCH) codes, circular redundancy check (CRC) codes, Golay codes, Reed-Muller codes, Goppa codes, and Denniston codes, among others. As a non-limiting example, the ECC component 107 can be operated based on Hamming code and generate parity symbols (as ECC symbols). The ECC component 107 can include circuitry and/or firmware in order to perform ECC operations. The ECC component 107 can include a checksum modifier 222 that can include circuitry, hardware, firmware, and/or software that modifies checksum data, as will be described further below. While illustrated as internal to the ECC component 107, the checksum modifier 222 be external to the ECC component 107.

In a non-limiting example, apparatus (e.g., the computing system 100 or the memory system 210 in FIG. 2) includes a memory system controller 115 and memory devices 130-1 to 130-N. The controller 115 can receive data from an external device, such as a host, and the data can include poison data, such as a poison data indictor, that indicates whether a particular portion of data is poison (e.g., corrupted or incorrect). In some embodiments, the external device can send write requests to the apparatus and cause data associated with each of the write requests to be written to a cache (not illustrated) and/or to the memory device 130. In some embodiments, the controller 115 can receive the write requests at a rate of thirty-two (32) gigatransfers per second (e.g., in some embodiments, the controller 115 can receive the write requests according to a CXL protocol). The controller 115 can also receive read requests and cause data stored in the memory device 130 to be retrieved and written to, for example, the external device. A cache associated with the apparatus can include multiple cache lines, which can each be configured to store around sixty-four (64) bytes of data. Embodiments are not limited to this particular cache line size, however, and the cache line size can be chosen to correspond to a line size associated with an external processing device such as a CPU of the host 120.

The memory system controller 115 can include a processor 117 (e.g., a processing device) configured to execute instructions stored in a local memory 119. In the illustrated example, the local memory 119 of the memory system controller 115 includes an embedded memory configured to store instructions for performing various processes, operations, logic flows, and routines that control operation of the apparatus, including handling communications between the apparatus and an external device.

In some embodiments, the local memory 119 can include memory registers storing memory pointers, fetched data, etc. The local memory 119 can also include read-only memory (ROM) for storing micro-code. In general, the memory system controller 115 can receive commands or operations from an external device and can convert the commands or operations into instructions or appropriate commands to achieve the desired access to the memory device 130. The memory system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory system controller 115 can further include host interface circuitry to communicate with a host system (e.g., host system 220 in FIG. 2) via the physical host interface, such as a PCIe/CXL interface described above. The host interface circuitry can convert the commands received from the host system into command instructions to access the memory device 130 as well as convert responses associated with the memory device 130 into information for the host system.

The embodiment of FIG. 1 can include additional circuitry that is not illustrated so as not to obscure embodiments of the present disclosure. For example, the memory system controller 115 can include address circuitry to latch address signals provided over I/O connections through I/O circuitry. Address signals can be received and decoded by a row decoder and a column decoder to access the memory device 130. It will be appreciated by those skilled in the art that the number of address input connections can depend on the density and architecture of the memory device 130.

Figure 2:
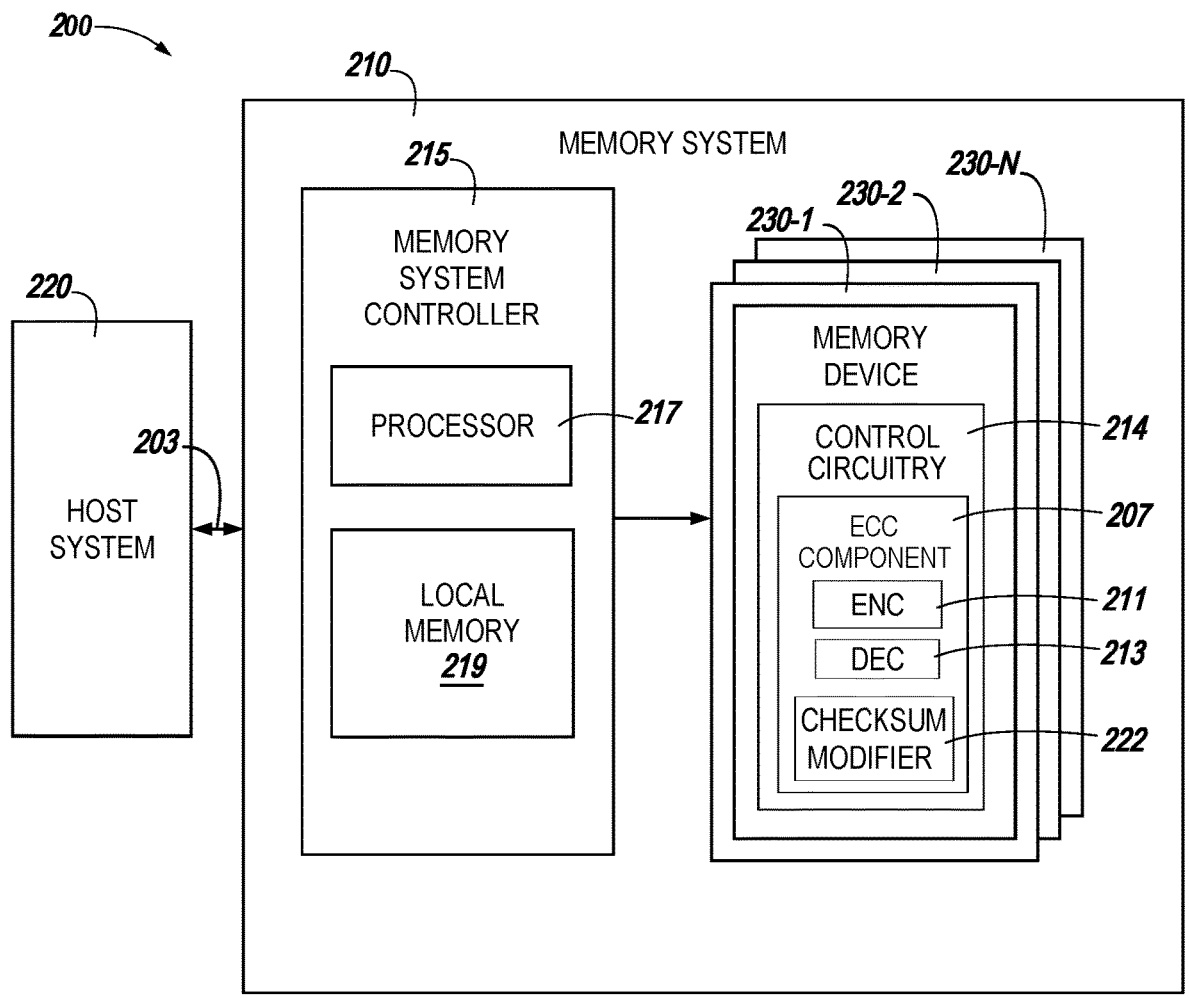
FIG. 2 is a block diagram in the form of a computing system including a memory system, which includes a controller and memory devices in accordance with a number of embodiments of the present disclosure.

FIG. 2 is a block diagram in the form of a computing system 200 including an apparatus including a memory system 210, which includes a controller 215, and memory devices 230-1 to 230-N in accordance with a number of embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example. In the embodiment illustrated in FIG. 2, the memory devices 230 can include one or more memory modules (e.g., single in-line memory modules, dual in-line memory modules, etc.). The memory devices 230 can include volatile memory and/or non-volatile memory. In a number of embodiments, the memory devices 230 can each include a multi-chip device. A multi-chip device can include a number of different memory types and/or memory modules. For example, a memory system can include non-volatile or volatile memory on any type of a module.

The memory device(s) 230 can provide main memory for the computing system 200 or could be used as additional memory or storage throughout the computing system 200. The memory device 230 can include one or more arrays of memory cells, (e.g., volatile and/or non-volatile memory cells, such as NVRAM, ReRAM, FeRAM, MRAM, PCM, "emerging" memory devices such as a ferroelectric RAM device that includes ferroelectric capacitors that can exhibit hysteresis characteristics, a 3-D Crosspoint (3D XP) memory device, etc., or combinations thereof). The arrays can be flash arrays with a RAM, ROM, DRAM, SDRAM, PCRAM, RRAM, and flash memory, among others. Embodiments are not limited to a particular type of memory device. For instance, the memory device can include NAND architecture, or NOR memory, for example Although shown as a single memory device 230, it will be appreciated that multiple memory devices are contemplated within the scope of the disclosure.

As an example, a ferroelectric RAM device can include ferroelectric capacitors and can perform bit storage based on an amount of voltage or charge applied thereto. In such examples, relatively small and relatively large voltages allow the ferroelectric RAM device to exhibit characteristics similar to normal dielectric materials (e.g., dielectric materials that have a relatively high dielectric constant) but at various voltages between such relatively small and large voltages the ferroelectric RAM device can exhibit a polarization reversal that yields non-linear dielectric behavior.

As another example, a 3D XP array of non-volatile memory can perform bit storage based on a change of bulk resistance, in conjunction with a stackable cross-gridded data access array. Additionally, in contrast to many flash-based memories, 3D XP non-volatile memory can perform a write in-place operation in which a non-volatile memory cell can be programmed without the non-volatile memory cell being previously erased.

In some embodiments, the controller 215 can be a media controller such as a non-volatile memory express (NVMe) controller. For example, the controller 215 can be configured to perform operations such as copy, write, read, error correct, etc. for the memory device 230. In addition, the controller 215 can include special purpose circuitry and/or instructions to perform various operations described herein. That is, in some embodiments, the controller 215 can include circuitry and/or instructions that can be executed to modify checksum data using a poison data indictor (also referred to herein as a second set of at least one bit, where the second set of at least one bit indicates whether a first set of bits comprises one or more erroneous or corrupted bits). In some embodiments, circuitry and/or instructions provided to the controller 215 can control modifying checksum data using a poison data indictor and storing the data (also referred to herein as a first set of bits including data) and the modified checksum data in the memory device 230.

In some embodiments, control circuitry 214 within each of the memory devices 230 can be configured to perform operations such as copy, write, read, error correct etc. The control circuitry 214 can include an ECC component 207. The ECC component 207 can be operated based on various types of ECC codes, such as Hamming codes, Reed-Solomon (RS) codes, Bose-Chaudhuri-Hochquenghem (BCH) codes, circular redundancy check (CRC) codes, Golay codes, Reed-Muller codes, Goppa codes, and Denniston codes, among others. As a non-limiting example, the ECC component 207 can be operated based on Hamming code and generate parity symbols (as ECC symbols). The ECC component 207 can include circuitry and/or firmware in order to perform ECC operations. The ECC component 207 can include an ECC encoder ("ENC") 211 and an ECC decoder 213. The ECC component 207 can include a checksum modifier 222 that can include logic and/or circuitry that can cause the modification of the checksum data in order to include the poison data indictor within modified checksum data. The ECC encoder ("ENC") 211 can include logic and/or circuitry that can cause an encoding of data to generate parity data and checksum data. The ECC decoder ("DEC") 213 can include logic and/or circuitry that can cause a decoding of the data and the modified checksum data, as will be described further in association with FIG. 3 below, in order to extract the poison data indictor to provide to an external device and/or a host 220.

In a non-limiting example, apparatus (e.g., the computing system 200 or the memory system 210) includes a memory system controller 215 and memory devices 230-1 to 230-N. The controller 215 can receive data from an external device, such as a host 220, and the data can include poison data, such as a poison data indictor, that indicates whether a particular portion of data is poison (e.g., corrupted or incorrect). In some embodiments, the host 220 can send write requests to the memory system 210 and cause data associated with each of the write requests to be written to a cache (not illustrated) and/or to the memory device 230. In some embodiments, the controller 215 can receive the write requests at a rate of thirty-two (32) gigatransfers per second (e.g., in some embodiments, the controller 215 can receive the write requests according to a CXL protocol). The controller 215 can also receive read requests and cause data stored in the memory device 230 to be retrieved and written to, for example, the host 220. A cache associated with the memory system 210 can include multiple cache lines, which can each be configured to store around sixty-four (64) bytes of data. Embodiments are not limited to this particular cache line size, however, and the cache line size can be chosen to correspond to a line size associated with an external processing device such as a CPU of the host 220.

The memory system controller 215 can include a processor 217 (e.g., a processing device) configured to execute instructions stored in a local memory 219. In the illustrated example, the local memory 219 of the memory system controller 215 includes an embedded memory configured to store instructions for performing various processes, operations, logic flows, and routines that control operation of the memory system 210, including handling communications between the memory system 210 and the host system 220.

In some embodiments, the local memory 219 can include memory registers storing memory pointers, fetched data, etc. The local memory 219 can also include read-only memory (ROM) for storing micro-code. While the example memory sub-system 210 in FIG. 2 has been illustrated as including the memory system controller 215, in another embodiment of the present disclosure, a memory sub-system 210 does not include a memory system controller 215, and can instead rely upon external control (e.g., provided by an external host, or by a processor or controller separate from the memory system).

In general, the memory system controller 215 can receive commands or operations from the host system 220 and can convert the commands or operations into instructions or appropriate commands to achieve the desired access to the memory device 230. The memory system controller 215 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 230. The memory system controller 215 can further include host interface circuitry to communicate with the host system 220 via the physical host interface, such as a PCIe/CXL interface described above. The host interface circuitry can convert the commands received from the host system into command instructions to access the memory device 230 as well as convert responses associated with the memory device 230 into information for the host system 220.

As illustrated in FIG. 2, a host 220 can be coupled to the memory system 210 via an interface 203. The interface 203 can be any type of communication path, bus, or the like that allows for information to be transferred between the host 220 and the memory system 210. Non-limiting examples of interfaces can include a peripheral component interconnect (PCI) interface, a peripheral component interconnect express (PCIe) interface, a serial advanced technology attachment (SATA) interface, and/or a miniature serial advanced technology attachment (mSATA) interface, among others. However, in at least one embodiment, the interface 203 is a PCIe 5.0 interface that is compliant with the compute express link (CXL) protocol standard. Accordingly, in some embodiments, the interface 203 can support transfer speeds of at least 32 gigatransfers per second.

In some embodiments, the interface 203 can be configured such that signaling can be selectively transferred via the interface 203 according to multiple protocols. For example, signaling can be selectively transferred via the interface 203 according to a cache protocol in which data is transferred between a host and the memory system 210 and a memory protocol in which data is transferred between a host and the memory device 230. In some embodiments, the cache protocol can be invoked to efficiently cache data associated with the host memory 205 according to a request and response approach. In contrast, the memory protocol can be invoked to provide access to the memory device 230 by the host using read/write command with a host processor acting as a primary device and the memory device 230 acting as a secondary (e.g., subordinate) device.

In a number of embodiments, the memory device 230 can be resident on the memory system 210, however, embodiments are not so limited and, in some embodiments, the memory device 230 can be external to the memory system 210. Further, more than one memory device can be included in the computing system 200, as is illustrated in FIG. 2. As used herein, the term "resident on" refers to something that is physically located on a particular component. For example, the memory device 230 being "resident on" the memory system 210 refers to a condition in which the memory device 230 is physically within the memory system 210. The term "resident on" may be used interchangeably with other terms such as "deployed on" or "located on," herein.

The host 220 can include host memory and a central processing unit (not illustrated). The host 220 can be a host system such as a personal laptop computer, a desktop computer, a digital camera, a smart phone, a memory card reader, and/or internet-of-thing enabled device, among various other types of hosts, and can include a memory access device, e.g., a processor (or processing device). One of ordinary skill in the art will appreciate that "a processor" can intend one or more processors, such as a parallel processing system, a number of coprocessors, etc.

The host 220 can include a system motherboard and/or backplane and can include a number of processing resources (e.g., one or more processors, microprocessors, or some other type of controlling circuitry). The system 200 can include separate integrated circuits or the host 220, the memory system 210, the controller 215, and the memory devices 230 can be on the same integrated circuit. The system 200 can be, for instance, a server system and/or a high-performance computing (HPC) system and/or a portion thereof. Although the example shown in FIG. 2 illustrate a system having a Von Neumann architecture, embodiments of the present disclosure can be implemented in non-Von Neumann architectures, which may not include one or more components (e.g., CPU, ALU, etc.) often associated with a Von Neumann architecture.

The embodiment of FIG. 2 can include additional circuitry that is not illustrated so as not to obscure embodiments of the present disclosure. For example, the storage controller 210 can include address circuitry to latch address signals provided over I/O connections through I/O circuitry. Address signals can be received and decoded by a row decoder and a column decoder to access the memory device 230. It will be appreciated by those skilled in the art that the number of address input connections can depend on the density and architecture of the memory device 230.

Figure 3:
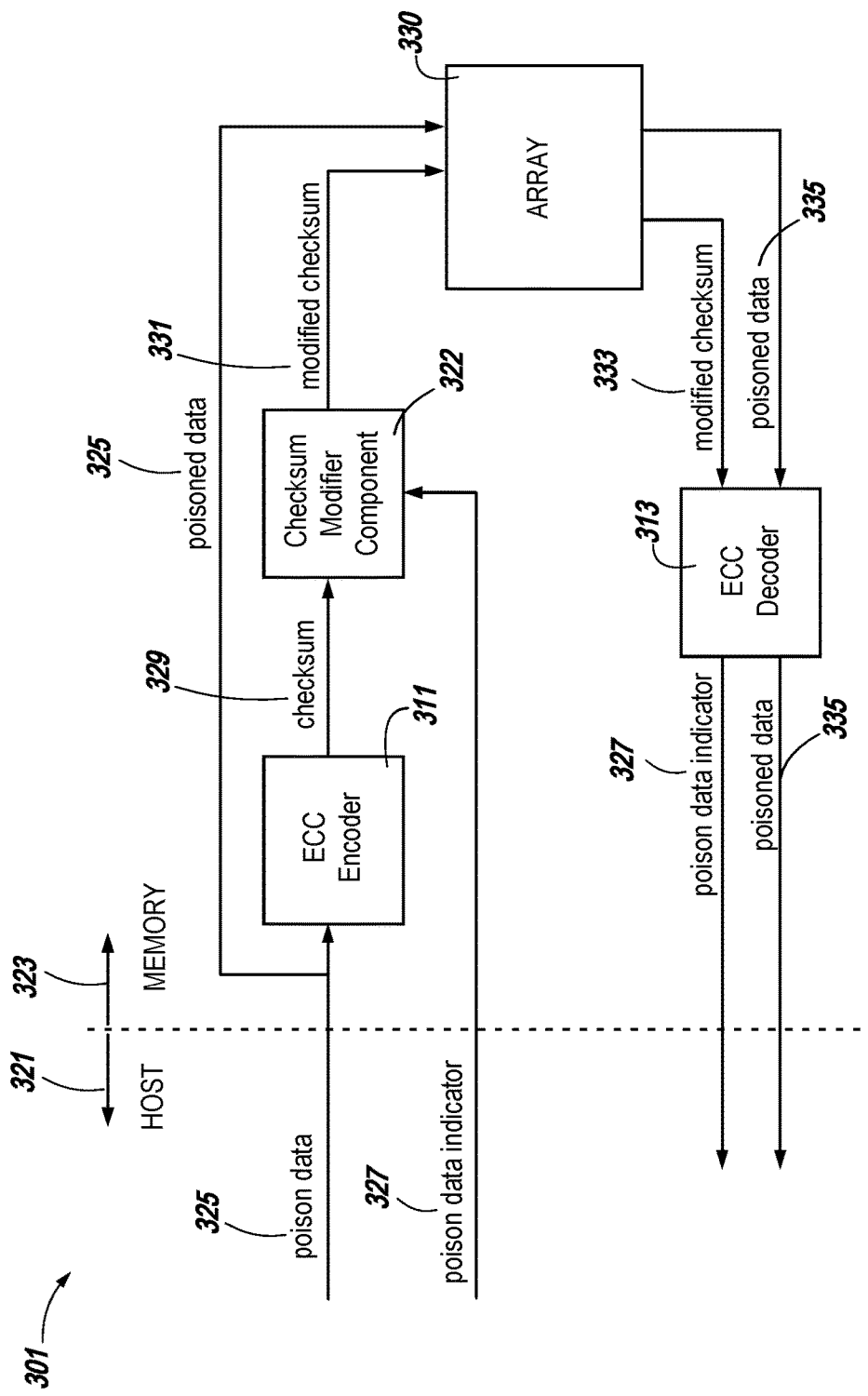
FIG. 3 is a functional block diagram in the form of a computing system in accordance with a number of embodiments of the present disclosure.

FIG. 3 is a functional block diagram in the form of a computing system 301 including a host portion 321 and a memory portion 323 including an array 330, an ECC encoder 311, a checksum modifier component 322, and an ECC decoder 313 in accordance with a number of embodiments of the present disclosure. The host portion 321 indicates communication from a host, such as host 120 in FIG. 1, to the memory portion 323, such as to a memory device 130 in FIG. 1. A dotted line is illustrated where arrows crossing the dotted line indicate that communication has occurred between the host and the memory device, both to and from the memory device and from and to the host. While a host is described in this example, embodiments are not so limited. For example, an external device that is separate from the memory device (such as separate from memory device 130 in FIG. 1) can be in communication with the memory device.

In some embodiments, data can be sent from a host (e.g., from host side 321) to a memory device (e.g., to memory side 323). A poison data indictor 327 (also referred to herein as a second set of at least one bit) can be sent as part of a write command from the host. A value of the poison data indictor (e.g., a "1" or a "0") indicates whether data (such as data 325, also referred to as a first set of bits including data) is poison data or not. In the example shown in FIG. 3, the data 325 is poison data, so the poison data indictor (bit) would have a value of "1", assuming "1" indicates poison and "0" indicates not poison.

While, in this example, the data is described as poison data, which correlates to a particular value of the poison data indictor (e.g., a binary "1"), examples are not so limited. For instance, in another example, the received data 325 may not be poison data, in which case the value of the poison data indictor may be a different bit value (such as a binary "0"). In an example where the data 325 is not poison, the checksum data 329 may not be modified. That is, the checksum data 329 would be modified if the data is poison and the checksum data 329 would not be modified if the data was not poison, in this example. Further, the poison data 325 can be sent from the host to the ECC encoder 311 and to the array 330 of memory cells of the memory device. The ECC encoder 311 can generate parity data and checksum data from the received poison data. The checksum data 329 transferred from the ECC encoder 311 to the checksum modifier component 322 does not yet indicate whether the poisoned data 325 is poison or not (e.g., the checksum data 329 has not incorporated the poison data indictor).

The checksum modifier component 322 can be hardware (e.g., circuitry, combinatorial circuitry, a circuit with a state machine, etc.), firmware, and/or software configured to perform operations that result in modified checksum data 331. The checksum modifier component 322 can receive the checksum data 329 and the poison bit 327 and modify the checksum data 329 in response to the poison data indicator (e.g., poison bit) 327 being a particular value, as is described further below. The modified checksum data 331 can be sent to the array 330 along with the poisoned data 325 to be stored in memory cells of the array 330.

As an example, checksum data can be a 32-bit length portion of data used to detect whether data was stored correctly or incorrectly, or uncorrupted or corrupted. The checksum data can protect 64 bytes of data. When a value of the checksum data calculated from the 64 bytes of protected data that is read matches stored checksum data prior to the data being written, the data can be confirmed as correct or uncorrupted. To indicate that data is poison data (e.g., that the data includes one or more erroneous or corrupted bits), the checksum data can be written with an XOR of a specific poison data pattern, such as a 32-bit poison data pattern.

For example, in a first example where the data is not poison data, the data can be stored with unmodified checksum data. When the data is read out and a checksum is calculated, the calculated checksum can be compared to the unmodified checksum data and the data accessed from the memory would be indicated as valid (e.g., not poison). In a second example where the data is poison data, the checksum data would be modified (e.g., by the checksum modifier component 322 in FIG. 3) by performing an XOR operation on the checksum data and a poison data pattern, resulting in modified checksum data, which would then be stored with the data in the memory.

As an example, the unmodified checksum can be a 32-bit value identified as hexadecimal value "0x12345678." A poison data pattern can be a 32-bit value identified as "0x00000001." Since, in this example, the data is poison, the unmodified checksum "0x12345678" is XORed with "0x00000001," resulting in a modified checksum of "0x12345679." When the data is read out of the memory and a checksum determined, the determined checksum would not match the stored checksum. That is, the determined checksum would be "0x12345678" and the stored checksum (which would have been modified to indicate poison) would be "0x12345679." In this instance, an XOR operation can be performed on the determined checksum (e.g., "0x12345678") and the stored checksum (e.g., "0x12345679"), resulting in the poison data pattern (e.g., "0x00000001"). In response to the result being the poison data pattern, the data can be indicated as poison data.

If data is read and the unmodified checksum does not match the stored checksum, and the XOR of these two checksums does not match the poison pattern, then the data in memory was corrupted and presumably unreadable. In this case, the uncorrectable data is returned as the read request with a poison indicator. The memory location may then be updated with an ECC pattern that indicates the data was previously uncorrectable (i.e. with the poison pattern). This update of the memory ECC value allows a memory controller to know that on a future read the data was read correctly (although with poisoned data) and the memory controller does not need to inform the system of a bad read from memory (although the response from the read will indicate poison).

The following pseudocode can be performed in order to determine if the checksum data indicates data is poison:
Let checkValue=CheckFunc (64B data) represent check value generator.
Then data is stored in memory as:
checkValue=CheckFunc (writeData) XOR (writePoison? poisonPattern:0)
Reading the memory device is accomplished with:
xorPattern=CheckFunc (readData) XOR readCheckValue
if xorPattern==0)
    data is good and no poison indicator
else if (xor Pattern–poisonPattern)
    data is good and poison indicator
else
    data is not valid In response to an external device, such as a host, requesting the data from the array 330, the data (in this example, the poison data) 335-1 can be sent to the ECC decoder 313 along with the modified checksum data 333. In the event that the modified checksum data 331 sent to the array 330 is stored properly and transferred out of the array 330 without errors, the modified checksum data 331 will be the same as the modified checksum data 333. Likewise, as long as the poison data 325 is stored properly in the array 330, the poison data 335-1 is the same as the poison data 325. The ECC decoder 313 can decode the modified checksum data 333 and the poison data 335 in order to return the poison data 335-2 and the poison bit 327 to the host.

Figure 4:
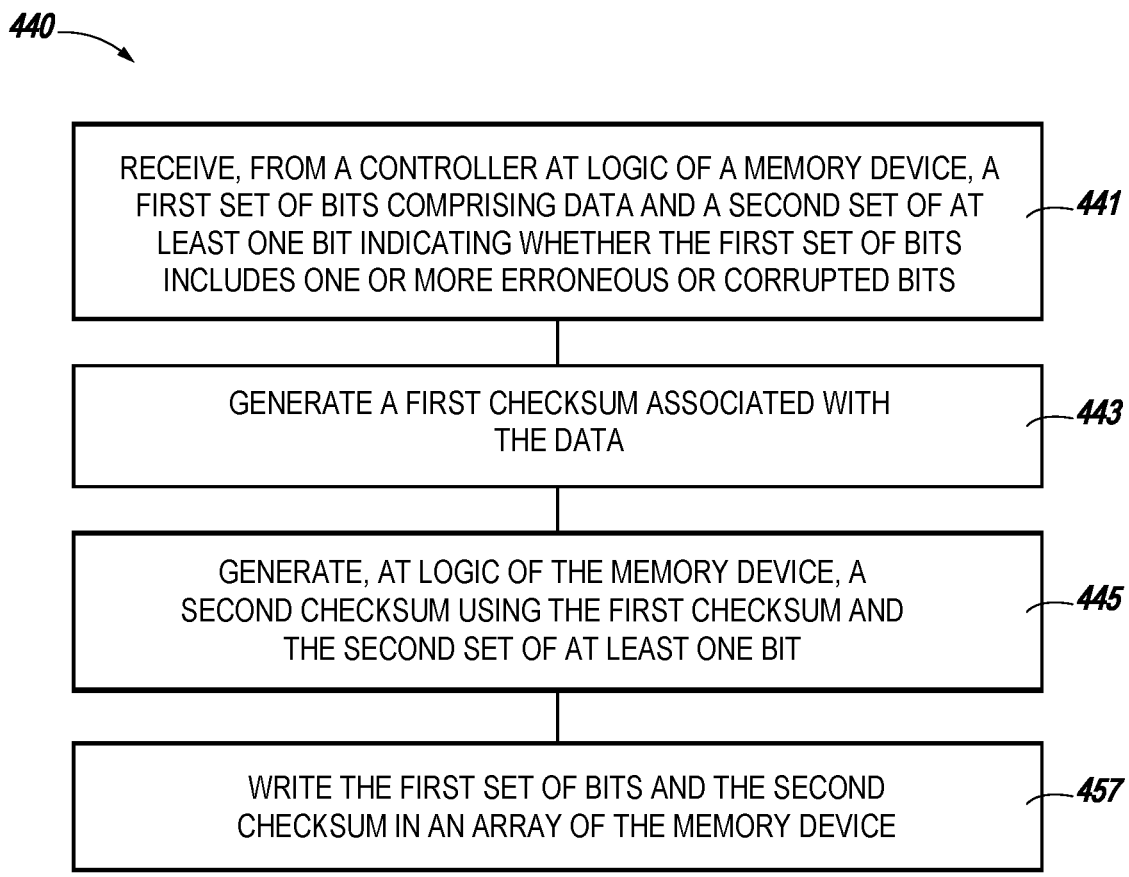
FIG. 4 is a flow diagram representing an example method for modifying a checksum using a poison data pattern in accordance with a number of embodiments of the present disclosure.

FIG. 4 is a flow diagram representing an example method for modifying a checksum using a poison data ipattern in accordance with a number of embodiments of the present disclosure. The method 440 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 440 is performed by the controller 115 illustrated in FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 441, the method 440 can include receiving, from a controller at logic of a memory device, a first set of bits including data and a second set of at least one bit (e.g., a poison data indictor) indicating whether the first set of bits includes one or more erroneous or corrupted bits. The controller can be analogous to the controller 115 in FIG. 1, herein. The memory device can be analogous to the memory system 110 in FIG. 1, herein. In some examples, the first set of bits and the second set of at least one bit (e.g., poison data) are received via a compute express link (CXL) compliant interface. The value of the poison data indictor can indicate whether the first set of bits has been corrupted or has become uncorrectable. The first set of bits (e.g., data) can be determined to be uncorrupted or corrupted based on the value of the poison data indictor. For instance, in some examples, a poison bit value of "1" can be used to indicate the data is corrupted and a poison bit value of "0" can be used to indicate the data is uncorrupted.

The received first set of bits can include X (or a first) quantity of data bits. The checksum data can include Z (or a second) quantity of checksum bits. The written first set of bits can include X (first quantity) data bits and the written modified checksum data can include Z (second quantity) checksum bits. In one example, a summation of the X data bits and the Z checksum bits equals Y bits (or a third quantity of bits), and Y bits can be written in relation to the received first set of bits, indicating whether the received first set of bits includes one or more erroneous or corrupted bits. In one example, a quantity of bits of the checksum data and a quantity of bits of the modified checksum data are equal.

At block 443, the method 440 can include generating a first checksum associated with the first set of bits (e.g., data). The first checksum can protect 64 bytes of data. When a value of the first checksum calculated from the 64 bytes of protected data that is read matches a stored checksum prior to the data being written, the data can be confirmed as correct or uncorrupted.

At block 445, the method 440 can include generating, at logic of the memory device, a second checksum with the first checksum and the second set of at least one bit (e.g., poison data indictor). Generating the second checksum can include performing a number of logical operations (e.g., a logical OR operation) on the first checksum and a poison data pattern.

At block 447, the method 440 can include writing the first set of bits and the second checksum in an array of the memory device. The array can be analogous to an array of memory cells in the memory device 130 in FIG. 1, herein. The method 440 can further include reading the written second checksum and the first set of bits from the array. The method 440 can further include generating, via a decoder component, the poison data indictor. The decoder component can be analogous to the decoder component 113 in FIG. 1, herein. The method 440 can further include providing the poison data indictor and the first set of bits to a host.

Figure 5:
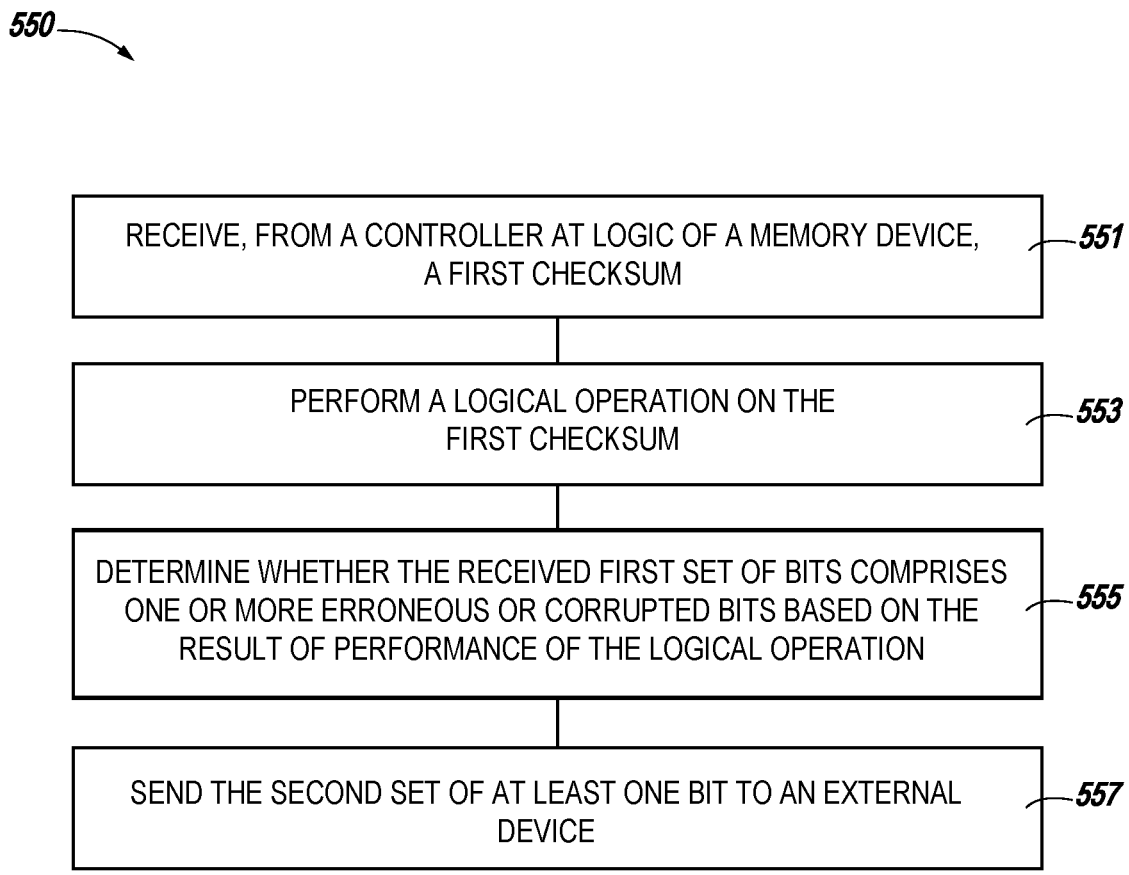
FIG. 5 is a flow diagram representing an example method for modifying a checksum using a poison data pattern in accordance with a number of embodiments of the present disclosure.

FIG. 5 is a flow diagram representing an example method for modifying a checksum using a poison data pattern in accordance with a number of embodiments of the present disclosure. The method 550 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 550 is performed by the controller 115 illustrated in FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 551, the method 550 can include receiving, from a controller at logic of a memory device, a first (or modified) checksum, wherein the first checksum is generated using a second checksum and a poison data indictor associated with a first set of bits that correlates to the second checksum. The first checksum can be previously generated by combining the second checksum associated with a first set of bits and a poison data pattern indicating whether the first set of bits includes at least one erroneous or corrupted bit (e.g., a poison data indictor). The second data and the poison data indictor can be initially received from a host. The controller can be analogous to the controller 115 in FIG. 1, herein. The memory system can be analogous to the memory system 110 illustrated in FIG. 1, herein. In some examples, the first set of bits and the poison data indictor are received via a compute express link (CXL) compliant interface. The poison data indictor can indicate whether the data has been corrupted or has become uncorrected. The first set of bits can be determined to be uncorrupted or corrupted based on the poison data indictor being a particular data value. In some examples, the first set of bits can be determined to be corrupted based on the poison data indictor being a "1" bit and determined to be uncorrupted based on the poison data indictor being a "0" bit.

At block 553, the method 550 can include performing a logical operation on the first checksum. The logical operation can be an XOR operation performed on the first checksum and a third checksum determined from the data read from the memory.

At block 555, the method 550 can include determining whether the received first set of bits includes one or more erroneous or corrupted bits based on the result of the performance of the logical operation. The logical operation can include performing an XOR operation on a determined checksum and a previously stored checksum. In response to the result being the poison data pattern, the first set of bits (or data) can be indicated as poison data. In response to the result being different than the poison data pattern, the data is indicated as both corrupted and not poison data.

At block 557, the method 550 can include sending the second set of at least one bit to an external device (e.g., a host), such as host 120 in FIG. 1. The method 550 can further include reading the stored modified checksum and the data from the array. The decoder component can be analogous to the decoder component 113 in FIG. 1, herein. The method 550 can further include providing the poison data indictor and the data to a host. In one example, the checksum is a 32-bit checksum. In one example, the 32-bit checksum protects a quantity of 64 bytes of data.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment.

Thus, the following claims are hereby incorporated into the Detailed Description, with each claim standing on its own as a separate embodiment.

What is claimed is:

1. A method, comprising:
   receiving, from a controller within logic of a memory device, a first set of bits comprising data and a second set of at least one bit indicating whether the first set of bits includes one or more erroneous or corrupted bits;
   generating a first checksum associated with the data;
   generating a second checksum using the first checksum and the second set of at least one bit; and
   writing the first set of bits and the second checksum in an array of the memory device.

2. The method of claim 1, wherein:
   the received first set of bits comprises a first quantity of data bits;
   the first checksum comprises a second quantity of bits that is different from the first quantity; and
   the second checksum comprises the second quantity of bits.

3. The method of claim 2, wherein a summation of the first quantity of bits and the second quantity of bits equals a third quantity of bits, and the third quantity of bits written in relation to the received first set of bits indicate whether the received first set of bits comprises one or more erroneous or corrupted bits.

4. The method of claim 1, wherein a quantity of bits of the first checksum and a quantity of bits of the second checksum are equal.

5. The method of claim 1, further comprising performing an XOR operation on the first checksum and a pattern of bits that indicate the data comprises the one or more erroneous or corrupted bits, wherein the second checksum is based at least in part on the XOR operation.

6. The method of claim 1, further comprising:
   reading the second checksum and the first set of bits from the array;
   determining whether the first set of bits comprises one or more erroneous or corrupted bits based on the second checksum; and
   transmitting the second set of at least one bit and the first set of bits to a host.

7. The method of claim 1, wherein the first set of bits and the second set of at least one bit are received via a compute express link (CXL) compliant interface.

8. The method of claim 1, wherein the second set of at least one bit indicates whether the data has been corrupted.

9. The method of claim 1, further comprising: performing a number of logical operations on the second set of at least one bit and the first checksum, wherein the second checksum is based at least in part on the number of logical operations.

10. A method, comprising:
    receiving, from a controller within logic of a memory device, a first checksum, wherein the first checksum is generated using a second checksum associated with a received first set of bits comprising data and a poison data pattern that indicates whether the first set of bits comprises one or more erroneous or corrupted bits;
    performing a logical operation on the first checksum;
    determining whether the received first set of bits comprises the one or more erroneous or corrupted bits based on the result of performance of the logical operation; and
    in response to determining that the received first set of data comprises the one or more erroneous or corrupted bits, sending a second set of at least one bit to an external device.

11. The method of claim 10, further comprising generating the first checksum by performing an XOR operation on the second checksum and the poison data pattern.

12. The method of claim 10, further comprising receiving the first set of bits and the second set of at least one bit from the host.

13. The method of claim 10, further comprising determining the first set of bits is not corrupted based on the second set of at least one bit being a particular data value.

14. The method of claim 10, further comprising determining the first set of bits is corrupted based on the second set of at least one bit being a particular data value.

15. The method of claim 10, wherein the second checksum is a 32-bit checksum.

16. The method of claim 15, wherein the 32-bit checksum protects a quantity of 64 bytes of data.

17. An apparatus, comprising:
    a controller within logic of a memory device, the controller configured to:
      receive a first set of bits and a second set of at least one bit indicating whether the first set of bits comprises one or more erroneous or corrupted bits;
      determine a first checksum associated with the first set of bits;
      in response to the second set of at least one bit indicating the first set of bits comprises the one or more erroneous or corrupted bits, generate a second checksum using the first checksum and a poison data pattern; and
      write the second checksum and the received first set of bits in a memory array of the memory device.

18. The apparatus of claim 17, wherein the controller is further configured to:
    receive the first set of bits and the second checksum from the memory array;
    compare the second checksum to the first checksum; and
    based on the comparison, determine whether the received first set of bits comprises the one or more erroneous or corrupted bits.

19. The apparatus of claim 17, wherein the controller is configured to, in response to determining that the received first set of bits comprises one or more erroneous or corrupted bits, send the second set of at least one bit and the first set of bits to a host.

20. The apparatus of claim 19, wherein the controller is configured to send the second set of at least one bit and the first set of bits to the host in response to the host requesting retrieval of the first set of bits from the memory array.

* * * * *